(12) United States Patent
Hartman et al.

(10) Patent No.: US 10,118,708 B2
(45) Date of Patent: Nov. 6, 2018

(54) EVACUATION SLIDE WITH BEAM STRUCTURE COMPRISING FOUR-POINT CROSS SECTION

(71) Applicant: Goodrich Corporation, Charlotte, NC (US)

(72) Inventors: Drew Hartman, Phoenix, AZ (US); Jaro S. Volny, Phoenix, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 307 days.

(21) Appl. No.: 14/886,499

(22) Filed: Oct. 19, 2015

(65) Prior Publication Data

US 2017/0106988 A1    Apr. 20, 2017

(51) Int. Cl.
*B64D 25/14*    (2006.01)

(52) U.S. Cl.
CPC .................................... *B64D 25/14* (2013.01)

(58) Field of Classification Search
CPC ........ B64D 25/14; B64D 25/00; B64D 25/08; B64D 25/10; Y10S 244/905; Y10S 2027/145; A62B 3/00; B63B 2027/145; B63B 7/08
See application file for complete search history.

(56) References Cited

U.S. PATENT DOCUMENTS

| | | | | |
|---|---|---|---|---|
| 3,370,684 A | * | 2/1968 | Holcombe | A62B 1/20 193/25 B |
| 3,712,417 A | * | 1/1973 | Chacko | B64D 25/14 182/48 |
| 3,860,984 A | | 1/1975 | Fisher | |
| 4,434,870 A | * | 3/1984 | Fisher | A62B 1/20 182/48 |
| 4,519,782 A | * | 5/1985 | Fisher | A62B 1/20 182/48 |
| 4,846,422 A | * | 7/1989 | Fisher | B64D 25/14 182/48 |
| 5,311,706 A | | 5/1994 | Sallee | |
| 6,454,220 B1 | * | 9/2002 | Oney | B64D 25/14 182/48 |
| 6,463,699 B1 | | 10/2002 | Bailey et al. | |
| 2002/0117354 A1 | * | 8/2002 | Baker | B64D 25/14 182/48 |

(Continued)

FOREIGN PATENT DOCUMENTS

| | | | | |
|---|---|---|---|---|
| GB | 1246999 | | 9/1971 | |
| GB | 1403504 | * | 9/1973 | ............. B64D 25/14 |

(Continued)

OTHER PUBLICATIONS

Extended European Search Report dated Feb. 9, 2017 in European Application No. 16194317.0.

(Continued)

*Primary Examiner* — Assres H Woldemaryam
(74) *Attorney, Agent, or Firm* — Snell & Wilmer L.L.P.

(57) ABSTRACT

According to various embodiments, disclosed is a beam structure comprising a four-point cross section for an inflatable article comprising an inflatable slide. The beam structure has greater beam strength and provides greater structural support than an inflatable beam having a traditional circular cross section.

19 Claims, 4 Drawing Sheets

(56) References Cited

U.S. PATENT DOCUMENTS

2003/0070871 A1* 4/2003 Idler ................... A62B 1/20
                                                                                            182/48
2010/0258677 A1* 10/2010 O'Donnell ............ B64D 25/14
                                                                                            244/137.2

FOREIGN PATENT DOCUMENTS

GB          1403504      8/1975
WO     2010142922 A1   12/2011

OTHER PUBLICATIONS

Communication Pursuant to Article 94(3) EPC dated Dec. 14, 2017 in European Application No. 16194317.0.

* cited by examiner

EVACUATION SLIDE WITH BEAM STRUCTURE COMPRISING FOUR-POINT CROSS SECTION

BACKGROUND

Typically, an inflatable aircraft evacuation slide comprising inflatable support beams requires sufficient strength in the beams to withstand high wind conditions and heavy loads imposed on the slide. Under current FAA standards, for example, under FAA Technical Standard Order C69c (TSO-C69c), a slide should have sufficient beam strength to withstand wind speeds as high as 25-30 knots (11.8-15.4 m/s), and to support sandbags weighing a total of 510 lbs (~231 kg) per slide lane. Therefore, inflatable support beams of typical evacuation slides require both vertical and horizontal strength in the support beams. Additionally, as the slide including an inflation source such as a compressed air cylinder, is typically packed within a small space in the aircraft, a reduction in the size of the slide and air cylinder, is desirable.

SUMMARY

In accordance with various embodiments, disclosed is an inflatable slide comprising: an elongated member comprising a sliding surface; and a support structure supporting the elongated member, the support structure comprising a first rail beam and a second rail beam bordering opposites sides of the elongated member, wherein the first rail beam and the second rail beam are inflatable, wherein the first rail beam and the second rail beam each have a four-point cross section, wherein the four-point cross section is defined by a longitudinal pair of opposite arcuate sections comprising a first arcuate section having a first peak point and a second arcuate section having a second peak point, and a transverse pair of opposite arcuate sections comprising a third arcuate section having a third peak point and a fourth arcuate section having a fourth peak point, wherein a longitudinal diameter between the first peak point and the second peak point intersects a transverse diameter between the third peak point and the fourth peak point, and wherein the four-point cross section is further defined by a first indent formed between the first arcuate section and the fourth arcuate section, a second indent formed between the second arcuate section and the third arcuate section, a third indent formed between the third arcuate section and the first arcuate section, and a fourth indent formed between the second arcuate section and the fourth arcuate section. In one embodiment, the inflatable slide is an aircraft emergency evacuation slide. In one embodiment, the longitudinal diameter equals the transverse diameter. In one embodiment, the longitudinal diameter and the transverse diameter intersect at about 90 degrees. In one embodiment, a first diameter between the first indent and the second indent intersects a second diameter between the third indent and the fourth indent at about 90 degrees. In one embodiment, the first diameter equals the second diameter. In one embodiment, the first diameter intersects the second diameter at about 90 degrees. In one embodiment, the four-point cross section is symmetrical about a central point, wherein the longitudinal diameter equals the transverse diameter, defining a large diameter of the four-point cross section, and the first diameter equals the second diameter, defining a small diameter of the four-point cross section, which is smaller than the large diameter. In one embodiment, a ratio between the small diameter to the large diameter is between 3:5 and 4:6. In one embodiment, the ratio between the small diameter to the large diameter is 4:5. In one embodiment, the sliding surface is bonded to the first rail beam at one of the first peak point, the second peak point, the third peak point, or the fourth peak point of the four-point cross section of the first rail beam, and wherein the sliding surface is bonded to the second rail beam at one of the first peak point, the second peak point, the third peak point, or the fourth peak point of the four-point cross section of the second rail beam.

In accordance with various embodiments, disclosed is an inflatable support structure comprising: a flexible material formed into an inflatable elongated configuration having a cross section of which when inflated defines four arcuate sections each having a peak point defined by the largest radial extent of an outer surface of the inflatable support structure at each of the four arcuate sections, a first pair of opposing peak points defining a first large transverse dimension and a second pair of opposing peak points defining a second large transverse dimension, four indentations being defined perimetrically between the peak points each of the four indentations having an indent point defined by the smallest radial extent of the outer surface of the inflatable support structure between perimetrically adjacent peak points, a first pair of opposing indent points defining a first small transverse dimension and a second pair of opposing indent point defining a second small transverse dimension. In one embodiment, the flexible material, when inflated, forms at least one of a first rail beam and a second rail beam, the first rail beam and the second rail beam providing a support structure for an elongated member comprising a sliding surface of the support structure, wherein the first rail beam and the second rail beam border opposite sides of the elongated member comprising the sliding surface. In one embodiment, the flexible material, when inflated, further forms a ground rail beam bordering on a bottom side of the elongated member. In one embodiment, the four arcuate sections of the flexible material are formed from more than one continuous gas fill chamber. In one embodiment, the flexible material forms at least a portion of an inflatable slide.

In accordance with various embodiments, disclosed is a support structure, the support structure comprising an inflatable four-point cross section beam structure, the four-point cross section beam structure including a four-point cross section, wherein the four-point cross section is defined by a longitudinal pair of opposite arcuate sections comprising a first arcuate section having a first peak point and a second arcuate section having a second peak point, and a transverse pair of opposite arcuate sections comprising a third arcuate section having a third peak point and a fourth arcuate section having a fourth peak point, wherein a first large transverse dimension between the first peak point and the second peak point intersects a second large transverse dimension between the third peak point and the fourth peak point, wherein the four-point cross section is further defined by a first indent formed between the first arcuate section and the fourth arcuate section, a second indent formed between the second arcuate section and the third arcuate section, a third indent formed between the third arcuate section and the first arcuate section, and a fourth indent formed between the second arcuate section and the fourth arcuate section, wherein a first small transverse dimension between the first indent and the second indent intersects a second small transverse dimension between the third indent and the fourth indent, and wherein the four-point cross section beam structure comprises at least one continuous gas fill chamber. In one embodiment, the four-point cross section is symmetrical about a central point, wherein the first large transverse dimension has a radial extent approximately equal to the radial extent of the second large transverse dimension, defining a large radial extent of the four-point cross section, and wherein the first large transverse dimension intersects the second large transverse dimension at about 90 degrees, wherein the first small transverse dimension has a radial extent approximately equal to the radial extent of the second small transverse dimension, defining a small radial extent of the four-point cross section, and wherein the first small transverse dimension and the second small transverse dimension intersect at about 90 degrees. In one embodiment, a ratio between the small radial extent to the large radial extent is between 3:5 and 4:6. In one embodiment, the inflatable article comprises an inflatable slide for emergency evacuation of an aircraft.

BRIEF DESCRIPTION OF THE DRAWINGS

The drawings described herein are for illustration purposes only and are not intended to limit the scope of the present disclosure in any way. The present disclosure will become more fully understood from the detailed description and the accompanying drawings wherein.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1A:
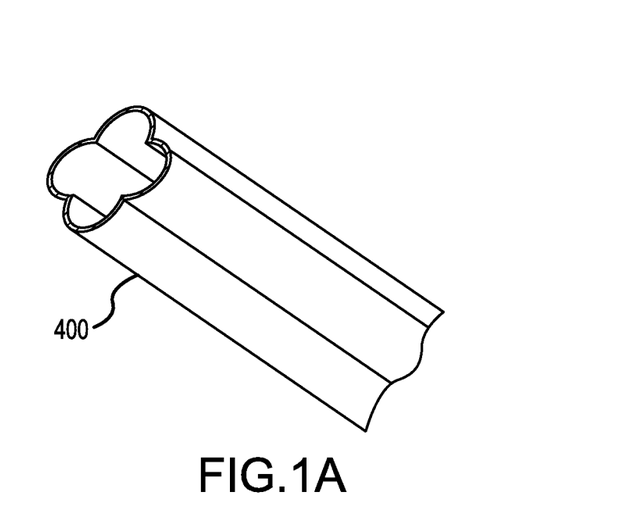
FIG. 1A illustrates a segment of a beam structure having a four-point cross section, according to various embodiments.
Figure 1B:
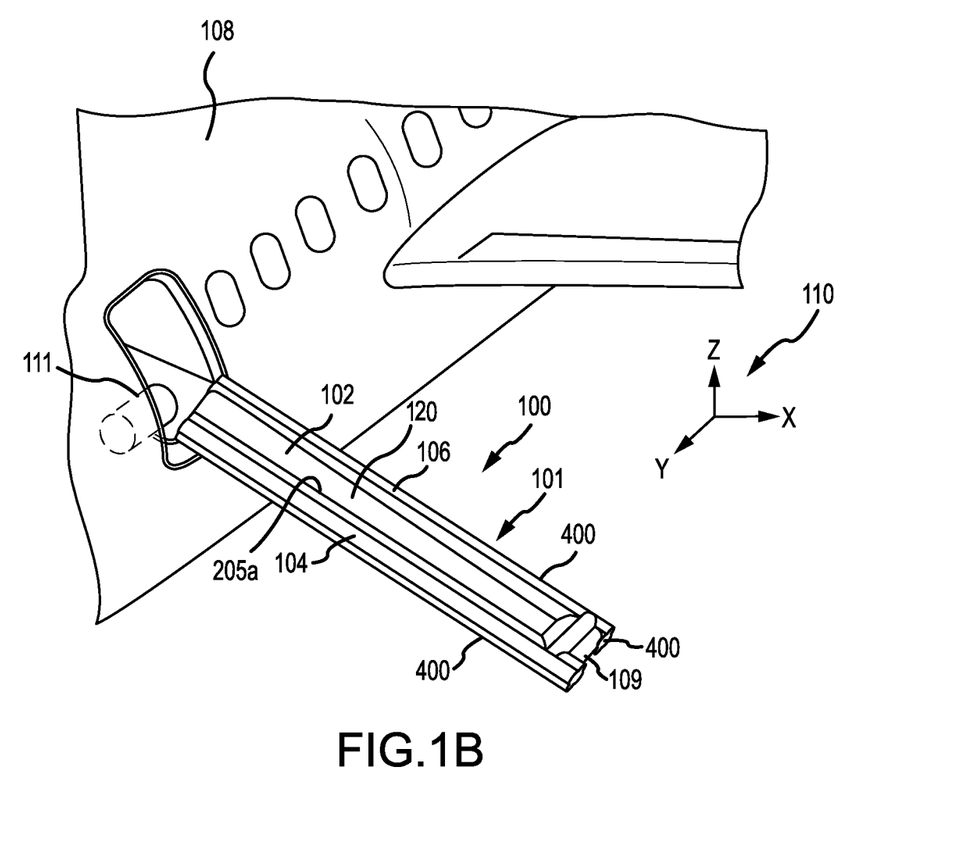
FIG. 1B illustrates an inflatable slide including the beam structure of FIG. 1A, according to various embodiments.

In accordance with various embodiments, disclosed is a beam structure 400, shown in FIG. 1A, comprising a four-point cross section 200 (see FIG. 2) for an inflatable slide 100 (shown in an inflated state in FIG. 1B). In various embodiments, the beam structure 400 comprises a flexible material formed into an inflatable elongated configuration having a cross section of which when inflated defines four arcuate sections of beam structure 400. The beam structure 400 (also referred to as "four-point cross section beam structure 400") has greater beam strength and provides greater structural support than an inflatable beam having a traditional circular cross section.

Figure 2:
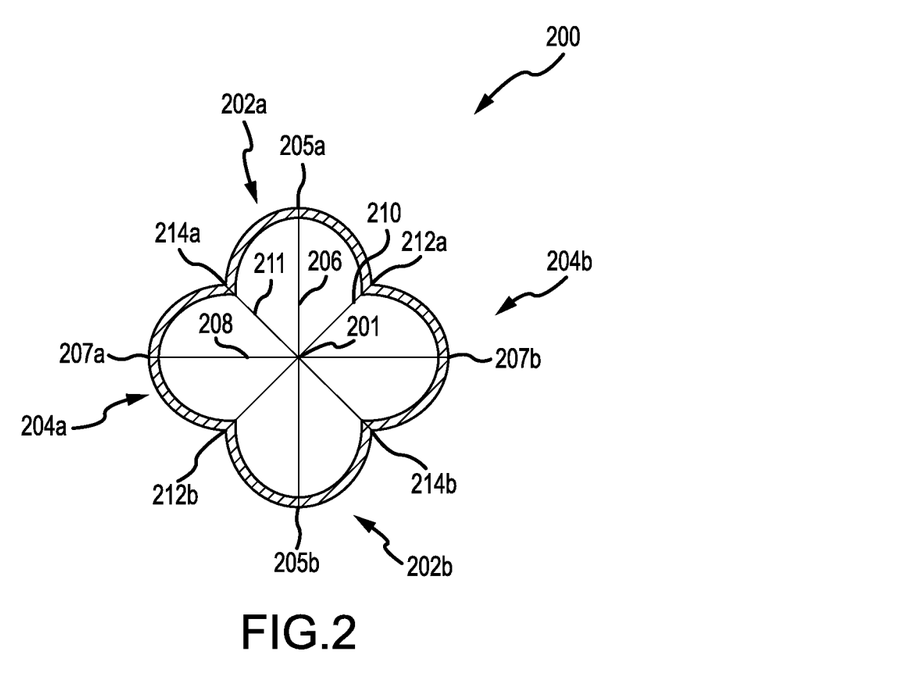
FIG. 2 shows the four-point cross section of the beam structure of FIG. 1A, according to various embodiments.

In accordance with various embodiments, as shown in FIG. 1B, the inflatable slide 100 comprising beam structure 400, generally includes an elongated member 120 having a sliding surface 102, supported by a support structure 101 which comprises at least two rail beams comprising a first rail beam 104 and a second rail beam 106, which are inflatable, and have a four-point cross section 200, as shown in FIG. 2. According to various embodiments, the first rail beam 104 and the second rail beam 106 border opposite sides of the elongated member 120.

According to various embodiments, the inflatable slide 100 comprising beam structure 400 may be used for emergency evacuation. According to various embodiments, the inflatable slide 100 is used for emergency evacuation of an aircraft 108 and is configured to pack within a compartment of the aircraft 108 (i.e. an aircraft door, a slide bustle, etc.). According to various embodiments, the inflatable slide 100 may be packed with an inflation source such as a compressed air cylinder 111. According to various embodiments, the inflatable slide 100 may be inflated at a pressure of between 2 psi (13.8 kPa) and 10 psi (68.9 kPA).

According to various embodiments, as shown in FIG. 2, the four-point cross section 200 of beam structure 400, has a clover-like geometry, and may be defined by a longitudinal pair of opposite arcuate sections comprising a first arcuate section 202a and a second arcuate section 202b; and a transverse pair of opposite arcuate sections comprising a third arcuate section 204a and a fourth arcuate section 204b, wherein a first large transverse dimension 206 defined between a first peak point 205a of the first arcuate section 202a and a second peak point 205b of the second arcuate section 202b, intersects with a second large transverse dimension 208) defined between a third peak point 207a of the third arcuate section 204a and a fourth peak point 207b of the fourth arcuate section 204b. According to various embodiments, the first large transverse dimension 206 equals the second large transverse dimension 208 (defining a large dimension of four-point cross section 200). According to various embodiments, the first large transverse dimension 206 intersects the second large transverse dimension 208 at about 90 degrees, wherein the term "about" in this context only means +/−5 degrees. According to various embodiments, four-point cross section 200 may further be defined by a first indent 212a formed between the first arcuate section 202a and the fourth arcuate section 204b; a second indent 212b formed between the second arcuate section 202b and the third arcuate section 204a; a third indent 214a formed between the third arcuate section 204a and the first arcuate section 202a; and a fourth indent 214b formed between the second arcuate section 202b and the fourth arcuate section 204b. A first small transverse dimension 210 defined between the first indent 212a and the second indent 212b intersects a second small transverse dimension 211 defined between the third indent 214a and the fourth indent 214b. According to various embodiments, the first small transverse dimension 210 equals the second small transverse dimension 211 (defining a small diameter of four-point cross section 200). According to various embodiments, the first small transverse dimension 210 intersects the second small transverse dimension 211 at about 90 degrees, wherein the term "about" in this context only means +/−5 degrees. According to various embodiments, four-point cross section 200 is symmetrical about a central point 201, wherein the first large transverse dimension 206 equals the second large transverse dimension 208, and wherein the first small transverse dimension 210 equals the second small diameter 211. According to various embodiments, wherein four-point cross section 200 is symmetrical about central point 201, the ratio between the small diameter to the large diameter is between 3:5 and 4:6. According to various embodiments, the ratio of the small diameter to the large diameter is 4:5.

In comparison to a gas filled beam having a traditional circular cross section beam structure, a gas filled beam with the beam structure 400 (wherein the diameter of the circular cross section equals the large diameter of the four-point cross section 200) may have a 1%-5% increase in support strength and a reduced inflatable interior volume. According to various embodiments, beam structure 400 including a small diameter of 16 inches (0.4064 m) and a large diameter of 20 inches (0.508 m) was found to have a 3.3% increase in support strength, and a 13% reduction of inflatable volume as compared to a circular cross section beam structure with a 20-inch (0.508 m) diameter. The resultant volume reduction is advantageous for packing the inflatable slide 100, into a limited amount of space, as the sizes of both the inflatable slide 100 and compressed air cylinder 111 are reduced.

Figure 3A:
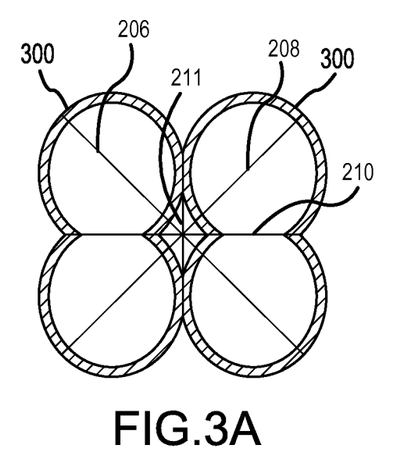
FIG. 3A shows the four-point cross section of FIG. 2, formed from two I-beam cross sections, according to various embodiments.
Figure 3B:
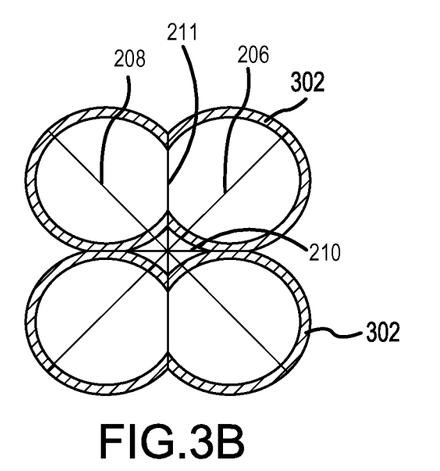
FIG. 3B shows the four-point cross section of FIG. 2, formed from two H-beam cross sections, according to various embodiments.
Figure 3C:
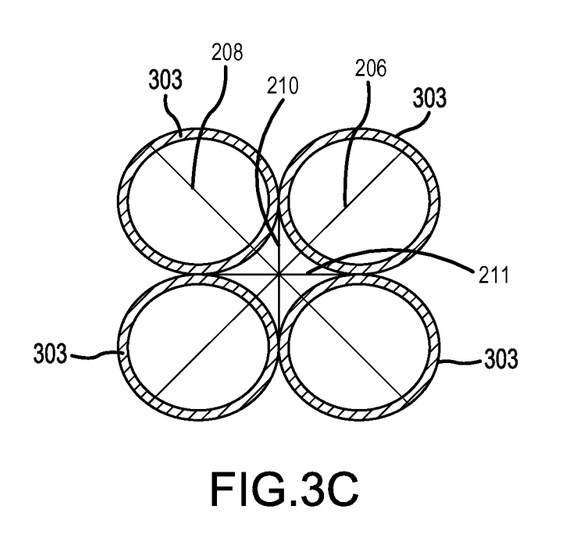
FIG. 3C shows the four-point cross section of FIG. 2, formed from four circular cross sections, according to various embodiments.
Figure 3D:
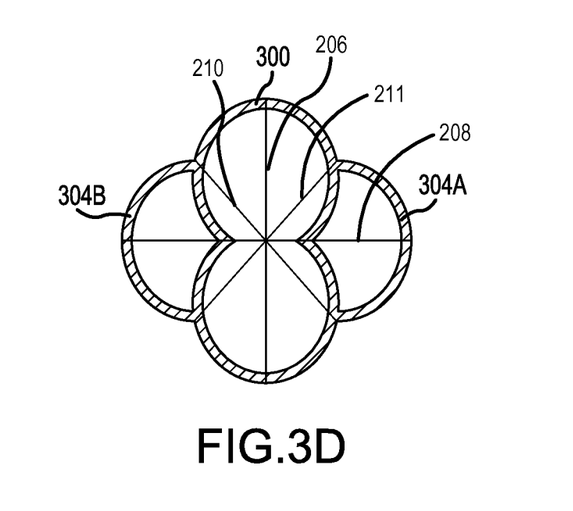
FIG. 3D shows the four-point cross section of FIG. 2, formed from an I-beam cross section and tube segments, and circular cross sections, according to various embodiments.

According to various embodiments, the beam structure 400 may comprise one continuous gas fillable chamber. According to various embodiments, beam structure 400 may comprise more than one air fill chambers. For example, beam structure 400 may be formed by bonding together two beams having an I-cross section 300 ("I-cross section beams") or two beams having an H-cross section 302 ("H-cross section beams"), shown in FIGS. 3A and 3B, according to various embodiments. According to various embodiments, beam structure 400 may be formed by bonding together four beams, having circular cross sections 303, as shown in FIG. 3C. According to various embodiments, beam structure 400 may be formed by bonding tube segments 304A and 304B on opposite sides of a tube having an H-cross section 302, or an I-cross section 300, as shown in FIG. 3D.

According to various embodiments, and with reference to FIG. 1B, the sliding surface 102 may be bonded between the first rail beam 104 and the second rail beam 106. According to various embodiments, sliding surface 102 may be bonded at or around a peak point (i.e. first peak point 205a, second peak point 205b, third peak point 207a, or fourth peak point 207b, shown in FIG. 2) of four-point cross section 200, as shown in FIG. 1. According to various embodiments, the sliding surface 102 may comprise a flexible fabric material such as a urethane rip stop material and/or a nylon based cloth with a urethane coating.

With continued reference to FIG. 1, according to various embodiments, the support structure 101 may further comprise a ground rail beam 109 bordering a bottom side of the sliding surface 102. According to various embodiments, ground rail beam 109 may have a four-point cross section, similar to the four-point cross section 200 of the first rail beam 104 and the second rail beam 106. According to various embodiments, ground rail beam 109 may have a circular or other cross section configuration, wherein the first rail beam 104 and the second rail beam 106 may each comprise the four-point cross section 200. According to various embodiments, the first rail beam 104 and the second rail beam 106 may be bonded to, or otherwise coupled with, the ground rail beam 109. According to various embodiments, the first rail beam 104, the second rail beam 106, and the ground rail beam 109 may form a continuous air filled unit (in response to inflation), in bordering engagement with sliding surface 102.

According to various embodiments, the support structure 101 may further comprise other inflatable structural components, such as transverse support beams, drop down support(s), a slide ramp, etc., which traditionally have a circular cross section. According to various embodiments, any one of such other inflatable structural components may also comprise four-point cross section 200. According to various embodiments, any one of such other inflatable structural components may be bonded to, or otherwise coupled with, the first rail beam 104 and the second rail beam 106, or may form a continuous air filled unit therewith, according to various embodiments. Specific embodiments may take into account factors such as available material, required/desired operational parameters, cost, slide design and size, etc.

Systems and methods are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. An inflatable slide comprising:
an elongated member comprising a sliding surface; and
a support structure supporting the elongated member, the support structure comprising a first rail beam and a second rail beam bordering opposites sides of the elongated member,
wherein the first rail beam and the second rail beam are inflatable,
wherein the first rail beam and the second rail beam each have a four-point cross section,
wherein the four-point cross section is made from inflatable chambers and is defined by:
a longitudinal pair of opposite arcuate sections comprising a first arcuate section having a first peak point and a second arcuate section having a second peak point, wherein a first large transverse dimension extends between the first peak point the second peak point, and
a transverse pair of opposite arcuate sections comprising a third arcuate section having a third peak point and a fourth arcuate section having a fourth peak point, wherein a second large transverse dimension extends between the third peak point and the fourth peak point,
wherein the first large transverse dimension intersects the second large transverse dimension, and
wherein the four-point cross section is further defined by a first indent formed between the first arcuate section and the fourth arcuate section, a second indent formed between the second arcuate section and the third arcuate section, a third indent formed between the third arcuate section and the first arcuate section, and a fourth indent formed between the second arcuate section and the fourth arcuate section, wherein a first small transverse dimension extends between the first indent and the second indent and a second small transverse dimension extends between the third indent and the fourth indent.

2. The inflatable slide of claim 1, wherein the inflatable slide is an aircraft emergency evacuation slide.

3. The inflatable slide of claim 1, wherein the first large transverse dimension equals the second large transverse dimension.

4. The inflatable slide of claim 1, wherein the first large transverse dimension and the second large transverse dimension intersect at about 90 degrees.

5. The inflatable slide of claim 1, wherein the first small transverse dimension intersects the second small transverse dimension at about 90 degrees.

6. The inflatable slide of claim 5, wherein the first small transverse dimension equals the second small transverse dimension.

7. The inflatable slide of claim 1, wherein the four-point cross section is made from three or fewer inflatable chambers.

8. The inflatable slide of claim 5, wherein the four-point cross section is symmetrical about a central point, wherein the first large transverse dimension equals the second large transverse dimension, defining a large diameter of the four-point cross section, and the first small transverse dimension equals the second small transverse dimension, defining a small diameter of the four-point cross section, which is smaller than the large diameter.

9. The inflatable slide of claim 8, wherein a ratio between the small diameter to the large diameter is between 3:5 and 4:6.

10. The inflatable slide of claim 8, wherein the ratio between the small diameter to the large diameter is 4:5.

11. The inflatable slide of claim 1, wherein
the sliding surface is bonded to the first rail beam at one of the first peak point, the second peak point, the third peak point, or the fourth peak point of the four-point cross section of the first rail beam, and
wherein the sliding surface is bonded to the second rail beam at one of the first peak point, the second peak point, the third peak point, or the fourth peak point of the four-point cross section of the second rail beam.

12. An inflatable support structure comprising:
a flexible material formed into an inflatable elongated configuration having a cross section of which when inflated defines four arcuate sections each having a peak point defined by the largest radial extent of an outer surface of the inflatable support structure at each of the four arcuate sections, a first pair of opposing peak points defining a first large transverse dimension and a second pair of opposing peak points defining a second large transverse dimension, four indentations being defined perimetrically between the peak points each of the four indentations having an indent point defined by the smallest radial extent of the outer surface of the inflatable support structure between perimetrically adjacent peak points, a first pair of opposing indent points defining a first small transverse dimension and a second pair of opposing indent point defining a second small transverse dimension, wherein the four arcuate sections are formed from three or fewer inflatable chambers.

13. The inflatable support structure of claim 12, wherein the flexible material, when inflated, forms at least one of a first rail beam and a second rail beam, the first rail beam and the second rail beam providing a support structure for an elongated member comprising a sliding surface of the support structure, wherein the first rail beam and the second rail beam border opposite sides of the elongated member comprising the sliding surface.

14. The inflatable support structure of claim 13, wherein the flexible material, when inflated, further forms a ground rail beam bordering on a bottom side of the elongated member.

15. The inflatable support structure of claim 12 wherein the four arcuate sections of the flexible material are formed from more than one continuous gas fill chamber.

16. The inflatable support structure of claim 15 wherein the flexible material forms at least a portion of an inflatable slide.

17. An inflatable article comprising a support structure, the support structure comprising an inflatable four-point cross section beam structure, the four-point cross section beam structure including a four-point cross section, wherein the four-point cross section is defined by a longitudinal pair of opposite arcuate sections comprising a first arcuate section having a first peak point and a second arcuate section having a second peak point, and a transverse pair of opposite arcuate sections comprising a third arcuate section having a third peak point and a fourth arcuate section having a fourth peak point, wherein a first large transverse dimension between the first peak point and the second peak point intersects a second large transverse dimension between the third peak point and the fourth peak point, wherein the four-point cross section is further defined by a first indent formed between the first arcuate section and the fourth arcuate section, a second indent formed between the second arcuate section and the third arcuate section, a third indent formed between the third arcuate section and the first arcuate section, and a fourth indent formed between the second arcuate section and the fourth arcuate section, wherein a first small transverse dimension between the first indent and the second indent intersects a second small transverse dimension between the third indent and the fourth indent, and wherein the four-point cross section beam structure comprises three or fewer inflatable chambers.

18. The inflatable article of claim 17, wherein the four-point cross section is symmetrical about a central point, wherein the first large transverse dimension intersects the second large transverse dimension at about 90 degrees, and wherein the first small transverse dimension and the second small transverse dimension intersect at about 90 degrees.

19. The inflatable article of claim 17, comprising an inflatable slide for emergency evacuation of an aircraft.

\* \* \* \* \*